(12) United States Patent
Martos et al.

(10) Patent No.: US 9,448,834 B2
(45) Date of Patent: Sep. 20, 2016

(54) AUTOMATED TESTING OF PHYSICAL SERVERS USING A VIRTUAL MACHINE

(71) Applicant: Unitrends, Inc., Columbia, SC (US)

(72) Inventors: Alberto Gonzalez Martos, Madrid (ES); Vernon Keith Boland, Lexington, SC (US)

(73) Assignee: Unitrends, Inc., Columbia, SC (US)

( * ) Notice: Subject to any disclaimer, the term of this patent is extended or adjusted under 35 U.S.C. 154(b) by 0 days.

(21) Appl. No.: 14/924,459

(22) Filed: Oct. 27, 2015

(65) Prior Publication Data

US 2016/0048438 A1 Feb. 18, 2016

Related U.S. Application Data

(63) Continuation of application No. 14/317,722, filed on Jun. 27, 2014, and a continuation of application No. 14/497,846, filed on Sep. 26, 2014.

(60) Provisional application No. 62/209,726, filed on Aug. 25, 2015.

(51) Int. Cl.
*G06F 11/00* (2006.01)
*G06F 9/455* (2006.01)
(Continued)

(52) U.S. Cl.
CPC ............. *G06F 9/45558* (2013.01); *G06F 8/61* (2013.01); *G06F 9/441* (2013.01); *G06F 11/1469* (2013.01); *G06F 2009/45579* (2013.01); *G06F 2201/815* (2013.01)

(58) Field of Classification Search
CPC ........... G06F 9/45558; G06F 11/1469; G06F 2201/815

USPC .......................................................... 718/1
See application file for complete search history.

(56) References Cited

U.S. PATENT DOCUMENTS 7,246,254 B2   7/2007   Alur et al.
7,487,383 B2   2/2009   Bensinger
(Continued)

OTHER PUBLICATIONS

Notice of Allowance on U.S. Appl. No. 14/497,846 dated May 20, 2016.
(Continued)

*Primary Examiner* — Joseph Kudirka
(74) *Attorney, Agent, or Firm* — Foley & Lardner LLP; John D. Lanza (57) ABSTRACT

An illustrative method for validating integrity of a source server backup includes receiving, at a recovery server, data indicating a state of a data storage unit associated with a source server, creating a virtual hard drive image from the received data, and storing, in memory of the recovery server, the created virtual hard drive image. The method also includes booting a virtual machine using the stored hard drive image and mounting a second drive image to the virtual machine including tools facilitating access to an operating system running on the virtual machine by an application running on the recovery server. The tools are prevented from being installed in an operating system running on the source server. The method further includes automatically detecting, by a recovery application running on the virtual machine, that the drive includes the tools, automatically installing, by the recovery application and without user intervention, the tools in the operating system running on the virtual machine, and controlling, by the application running on the recovery server, applications running on the virtual machine.

20 Claims, 8 Drawing Sheets

(51) Int. Cl.
*G06F 11/14* (2006.01)
*G06F 9/445* (2006.01)
*G06F 9/44* (2006.01)

(56) References Cited

U.S. PATENT DOCUMENTS

| | | | |
|---|---|---|---|
| 8,055,630 | B2 | 11/2011 | Dawson et al. |
| 8,156,301 | B1 | 4/2012 | Khandelwal et al. |
| 8,181,174 | B2 * | 5/2012 | Liu .................... G06F 9/44505 717/121 |
| 8,402,309 | B2 * | 3/2013 | Timashev ........... G06F 9/44589 707/679 |
| 8,423,821 | B1 | 4/2013 | Keith, Jr. |
| 9,235,474 | B1 | 1/2016 | Petri et al. |
| 2005/0108593 | A1 | 5/2005 | Purushothaman et al. |
| 2006/0074993 | A1 | 4/2006 | Pulamarasetti et al. |
| 2007/0260831 | A1 | 11/2007 | Michael et al. |
| 2007/0300220 | A1 * | 12/2007 | Seliger ...................... G06F 8/61 718/1 |
| 2008/0294933 | A1 | 11/2008 | Nishii et al. |
| 2009/0125751 | A1 | 5/2009 | Dawson et al. |
| 2009/0222496 | A1 | 9/2009 | Liu et al. |
| 2010/0077165 | A1 | 3/2010 | Lu et al. |
| 2012/0066446 | A1 | 3/2012 | Sabjan et al. |
| 2012/0124355 | A1 * | 5/2012 | Patro ..................... G06F 9/4401 713/2 |
| 2012/0233282 | A1 * | 9/2012 | Voccio ................ G06F 9/45558 709/212 |
| 2012/0246639 | A1 * | 9/2012 | Kashyap ............. G06F 9/45558 718/1 |
| 2013/0007726 | A1 * | 1/2013 | Poddar ...................... G06F 8/63 717/175 |
| 2013/0304901 | A1 | 11/2013 | Malnati |
| 2015/0058839 | A1 * | 2/2015 | Madanapalli ....... G06F 9/45558 718/1 |

OTHER PUBLICATIONS

O. H. Alhazmi and Y. K. Malaiya; "Assessing Disaster Recovery Alternatives: On-site, Colocation or Cloud," in 23rd IEEE International Symposium on Software Reliability Engineering Workshops; Dallas, TX, USA; 2012; pp. 19-20.

O. H. Alhazmi and Y. K. Malaiya; "Evaluating Disaster Recovery Plans Using the Cloud," Proc. Reliability and Maintainability Symposium (RAMS); 2013.

Office Action on U.S. Appl. No. 14/317,722 dated Mar. 11, 2016.

* cited by examiner

FIG. 8

AUTOMATED TESTING OF PHYSICAL SERVERS USING A VIRTUAL MACHINE

CROSS-REFERENCE TO RELATED CASES

This application claims priority to U.S. patent application Ser. No. 14/317,722 filed Jun. 27, 2014, and U.S. patent application Ser. No. 14/497,846, filed Sep. 26, 2014. This application also claims priority to U.S. Provisional Application No. 62/209,726, filed on Aug. 25, 2015, all of which are hereby incorporated by reference in their entirety.

TECHNICAL FIELD

The present disclosure relates, in general, to recovery methods of computing devices. More specifically, the present disclosure relates to using virtual machines to backup computing devices.

BACKGROUND

The following description is provided to assist the understanding of the reader. None of the information provided or references cited is admitted to be prior art. Many individuals, businesses, and systems rely on computing devices. When the computing devices fail, it is often important to have the computing devices recovered as quickly and reliably as possible. In some instances, a computing device can be replicated using a virtual machine.

SUMMARY

An illustrative method for validating integrity of a source server backup includes receiving, at a recovery server, data indicating a state of a data storage unit associated with a source server, creating a virtual hard drive image from the received data, and storing, in memory of the recovery server, the created virtual hard drive image. The method also includes booting a virtual machine using the stored hard drive image and mounting a second drive image to the virtual machine including tools facilitating access to an operating system running on the virtual machine by an application running on the recovery server. The tools are prevented from being installed in an operating system running on the source server. The method further includes automatically detecting, by a recovery application running on the virtual machine, that the drive includes the tools, automatically installing, by the recovery application and without user intervention, the tools in the operating system running on the virtual machine, and controlling, by the application running on the recovery server, applications running on the virtual machine.

An illustrative device for validating integrity of a source server backup includes a memory device that stores data indicating a state of a data storage unit associated with a source server and a processor operatively coupled to the memory device. The processor creates a virtual hard drive image from the received data, stores, in the memory device, the created virtual hard drive image, and boots a virtual machine using the stored hard drive image. The processor also mounts a second drive image to the virtual machine including tools facilitating access to an operating system running on the virtual machine by a device application. The tools are prevented from being installed in an operating system running on the source server. The processor also runs the device application, automatically detects, via a recovery application running on the virtual machine, that the drive includes the tools, and automatically installs, via the recovery application and without user intervention, the tools in the operating system running on the virtual machine. The processor further controls, via the device application, applications running on the virtual machine.

An illustrative non-transitory computer-readable medium including computer-readable instructions that, upon execution by a processor, cause a device to perform operations. The operations include receiving data indicating a state of a data storage unit associated with a source server, creating a virtual hard drive image from the received data, and storing, in memory of the device, the created virtual hard drive image. The operations also include booting a virtual machine using the stored hard drive image and mounting a second drive image to the virtual machine including tools facilitating access to an operating system running on the virtual machine by an application running on the recovery server. The tools are prevented from being installed in an operating system running on the source server. The operations also include automatically detecting, via a recovery application running on the virtual machine, that the drive includes the tools, automatically installing, via the recovery application and without user intervention, the tools in the operating system running on the virtual machine, and controlling, via the application running on the recovery server, applications running on the virtual machine.

In an illustrative embodiment a backup and restore method and computer is provided for backing up and immediate restoring of an application executing on another computer. The embodiment maintains a virtual machine image that includes the application and in some embodiments the operating system. The virtual machine image is created and maintained using a file backup method in which individual files are received from the other computer executing the application. In some instances, a virtual server can immediately boot up using the virtual machine image and execute the application. The virtual machine image is maintained in a ready state updated with the most recently received files. In such a state, the virtual machine image is immediately available to recover the application by allowing a virtual server to boot from the virtual machine image.

In an illustrative embodiment, there is provided a computer implemented method performed by a backup computer for backing up and restoring an application executing on another computer to immediately recover the application. The method includes creating a virtual machine image for the application where the virtual machine image can be immediately accessed to implement a recovery of the application, receiving files from a computer system executing the application, transforming the received files to the virtual machine image format, and updating the virtual machine image with the transformed received files.

An illustrative embodiment includes a backup computer that has a memory including computer instructions that implement the functions of the backup computer when executed. The backup computer also includes a processor in communication with the memory. The processor executes the computer instructions and causes the processor to create a virtual machine image for the application. The virtual machine image can be immediately accessed to implement a recovery of the application. The instructions further cause the processor to receive files from a computer system executing the application, transform the received files to the virtual machine image format, and update the virtual machine image with the transformed received files.

In an illustrative embodiment, a computer implemented method is performed by a disaster recovery validation computer in communication with a backup appliance. The method includes transmitting a restore command to the backup appliance. The restore command includes information that identifies a backup for the computer and virtual machine and causes the backup appliance to restore the backup to the virtual machine where the backup is maintained by the backup appliance. The method further includes receiving information from the backup appliance used to measure the time required to boot and bring up the backup on a virtual machine. The method also includes comparing the measured time to boot and bring up the backup on the virtual machine to a predetermined recovery time objective to determine if the measured recovery time meets the recovery time objective and transmitting the results of the comparison to the backup appliance to be stored as an attribute of the backup. The results include information identifying the backup.

In an illustrative embodiment, a computer implemented method is performed by a disaster recovery validation system. The method includes retrieving information about a digital backup that is stored on a backup appliance. The stored digital backup is for a first converged infrastructure computer platform and is maintained by the backup appliance. The backup appliance is responsible for backing up and restoring the first converged infrastructure computer platform. The method also includes transmitting a restore command to the backup appliance. The command includes information identifying the stored digital backup and causes the backup appliance to boot a second converged infrastructure computer platform from the identified stored digital backup and to execute the applications stored in the identified stored digital backup. The method further includes receiving from the backup appliance information used to measure the time required to boot the identified stored digital backup on the second converged infrastructure computer platform, comparing the measured time to boot the identified stored digital backup to a predetermined recovery time objective to determine if the identified stored digital backup meets the predetermined recovery time objective, and transmitting the results of the comparison to the backup appliance to be stored as an attribute of the backup wherein the results include information identifying the backup.

In an illustrative embodiment a disaster recovery validation system includes a backup appliance operable to execute a first application. The first application, when executed by the computer, causes the computer to maintain a backup for a first converged infrastructure computer platform, receive backup attribute information associated with the backup for the first converged infrastructure computer platform. and associate the received backup attribute information with the first converged infrastructure computer platform. The system also includes a computer operable to communicate with the backup appliance and operable to execute a second application. The second application, when executed by the computer, causes the computer to measure the time required to boot and bring up the backup on a second converged infrastructure computer platform, compare the measured time required to restore the backup to a predetermined recovery time objective to determine if restoring the backup meets the recovery time objective, and transmit the results of the comparison to the backup appliance to be stored as an attribute of the backup wherein the results include information identifying the backup.

An illustrative embodiment includes a computer-implemented method performed by a disaster recovery validation computer in communication with a backup appliance responsible for backing up a computer. The method includes isolating a virtual machine from production networks by assigning the virtual machine to an isolated network, determining the time required to boot and bring up a backup for the computer on the virtual machine where the backup is maintained by the backup appliance, and comparing the measured time to boot and bring up the backup to a predetermined recovery time objective to determine if the backup meets the recovery time objective. The method also includes transmitting the results of the comparison to the backup appliance to be stored as an attribute of the backup.

The foregoing summary is illustrative only and is not intended to be in any way limiting. In addition to the illustrative aspects, embodiments, and features described above, further aspects, embodiments, and features will become apparent by reference to the following drawings and the detailed description.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

In many instances, some level of disaster recovery for a computer or computer system is implemented. A disaster recovery plan may include one or more techniques for backing up part or all of the data, software, and information for operating a computer or a computer system. In many instances, the more critical that the application executed by the computer is, the higher the level of disaster recovery implemented by the computer is.

Computer backup systems may suitably provide functionality to backup and restore individual server computers, both at the physical and virtual level, to provide the ability to recover the server, for example, in the event of a disaster that renders the server unusable. Computer backup systems can recover the computer for any suitable reason. Such backups are often referred to as bare-metal backups because a new server can be restored from a blank or "bare metal" state back to the state of the original server, including its operating system and applications. In some instances, such backups are sometimes referred to as immediate recovery because, during the recovery process, an entire disk image is written to a disk. Once the disk image is stored, a server computer can boot from the disk.

Another illustrative method of backing up and recovering a server is known as a file level application backup. With this method, an initial full backup is made, and incremental updates of files are made as files are updated or created in the server being backed up. Such a method generally reduces the backup time because files that have not changed are not updated after the first update. It takes longer to recover a server using a file level application backup than when using a bare-metal backup, however during the backup phase, the bare-metal backup requires more computer resources than the file level application backup.

When one or more computer servers are needed to support software functions, the computer servers may be implemented using a converged infrastructure computer solution that is provided by a number of computer hardware vendors. A converged infrastructure computer solution includes an integrated chassis with one or more computer servers, one or more network switches, and disk storage. In addition to providing the physical components in the same chassis, the solution may also provide an integrated management component that manages the physical and logical configurations of the components in the chassis. Examples of such converged infrastructure platforms include Unified Computing System (UCS) provided by Cisco Systems, Inc., PowerEdge VRTX provided by Dell Inc., and PureSystems provided by International Business Machines Corp. (IBM).

Having a backup for a system does not necessarily satisfy all the metrics in a disaster recovery plan. Disaster recovery plans may suitably specify metrics such as a recovery time objective (RTO) and a recovery point objective (RPO). The disaster recovery plan metrics may suitably include a recovery time objective (RTO) that specifies the maximum amount of time required to recover both data and access to the data after a failure and a recovery point objective (RPO) that specifies the maximum age of the backed up data. Determining if a backup meets all of the requirements of the disaster recovery plan is often important to being able to manage disaster recovery for a computer system.

As described in greater detail below, in some embodiments, backups of a computer device can be tested before the computing device is restored (e.g., while the computer device is working properly). In some embodiments, testing the backups includes running a virtual machine to simulate restoring the computer device. Testing can include, in some embodiments, operating applications in the operating system environment of the virtual machine (that is simulating the computing device). An application running on a backup server operates the applications of the virtual machine. For the application on the backup server to have access to the operating system environment of the virtual machine, in many instances, tools (or instructions, scripts, etc.) are installed within the virtual machine. But, in many cases, the tools are prevented from being installed on an operating system that is running on a physical machine (e.g., not a virtual machine). Thus, in some instances, a backup of a physical machine cannot be tested as a virtual machine because the backup of the physical machine (and, therefore, the virtual machine running the backup) does not have the tools that allow access to the operating system.

In some embodiments, a backup agent (e.g., a script) is installed on the physical computing device that can facilitate installation of the tools that allows access to a virtual machine's operating system environment. Accordingly, while the tools may not be installed on the physical computer, when a backup of the physical computer is replicated using a virtual machine, the tools can be installed on the virtual machine after the virtual machine is booted up to allow access to the virtual machine.

Figure 1:
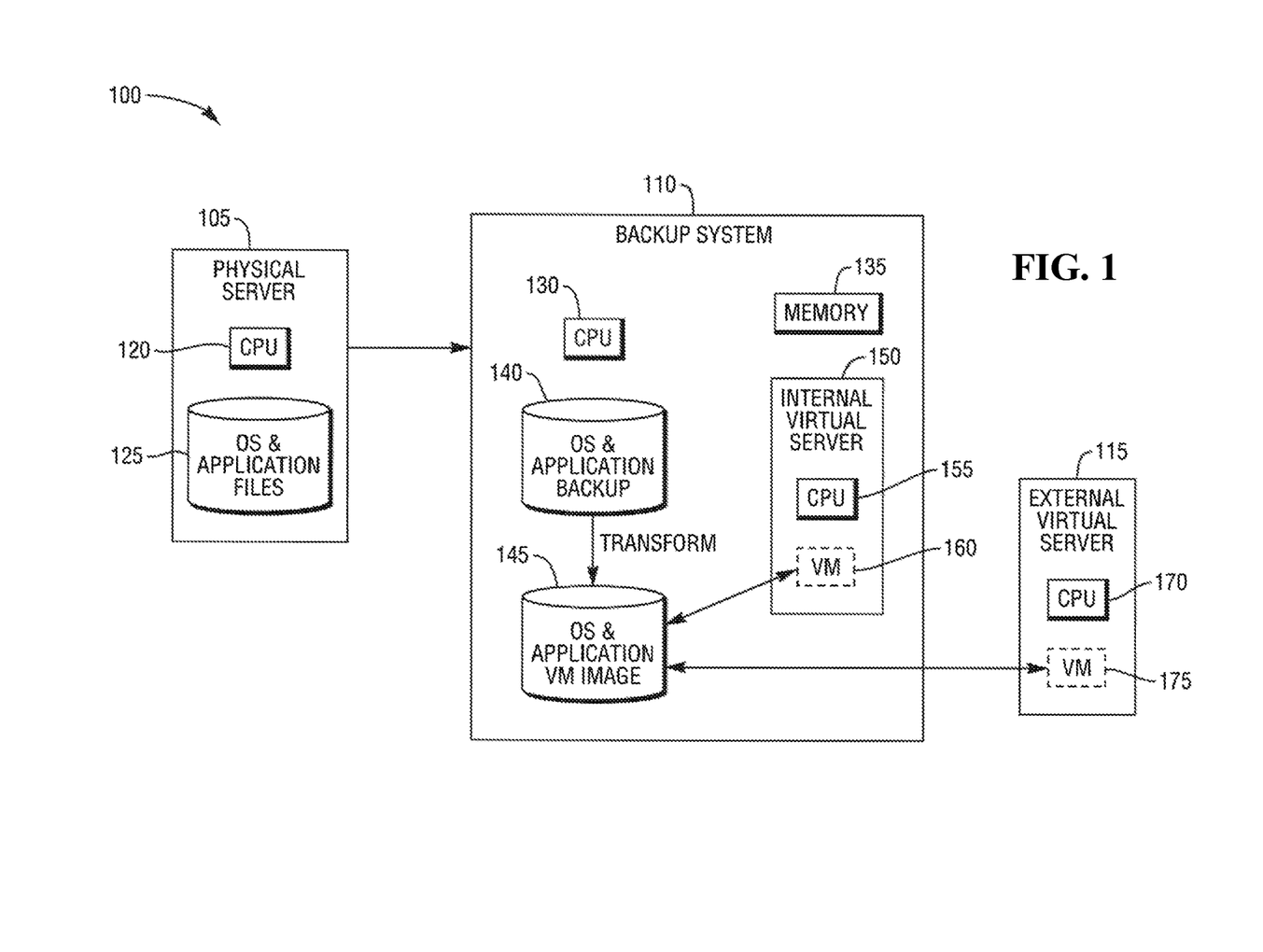
FIG. 1 is a block diagram of a backup system in accordance with an illustrative embodiment.

FIG. 1 is a block diagram of a backup system in accordance with an illustrative embodiment. In alternative embodiments, additional, fewer, and/or different elements may be used. A computer system 100 includes a backup system 110 in communication with a physical server 105 and an external virtual server 115.

The backup system 110 includes a central processing unit (CPU) 130 in communication with: a memory 135, a first storage device 140, a second storage device 145, and an internal virtual server 150. The first storage device 140 and the second storage device 145 may suitably include multiple non-volatile storage devices such as disk drives or solid state drives or a combination thereof. The CPU 130 executes software that is stored in the memory 135 which causes the CPU 130 to perform the functions of the backup system 110. The CPU 130 causes operating system (OS) and application backup data received from the physical server 105 to be transformed into an OS and Application VM Image stored on the second storage device 145. The internal virtual server 150 includes a CPU 155 which executes software to create a virtual machine (VM) 160. The CPU 130 may suitably cause an OS and Application VM Image stored on the second storage device 145 to be loaded into the VM 160 and executed by the internal virtual server 150. The CPU 130 may suitably cause an OS and Application VM Image stored on the second storage device 145 to be loaded into a virtual machine (VM) 175 of the external virtual server 115. A CPU 170 in the external virtual server 115 implements the VM 175.

The physical server 105 includes a central processing unit (CPU) 120 that executes one or more applications and an operating system that reside on a storage device 125. The storage device 125 may suitably include multiple non-volatile storage devices such as disk drives, solid state drives, or a combination thereof. The backup system 110 initiates a file-based (non-image based) backup of the physical server 105 at a specific point in time. In some embodiments, the backup either includes only the files associated with the application, or all files on the server including both the application and the operating system. The files are received by the backup system 110. In an illustrative embodiment, the files are converted to a backup format and stored on the first storage device 140.

Figure 2:
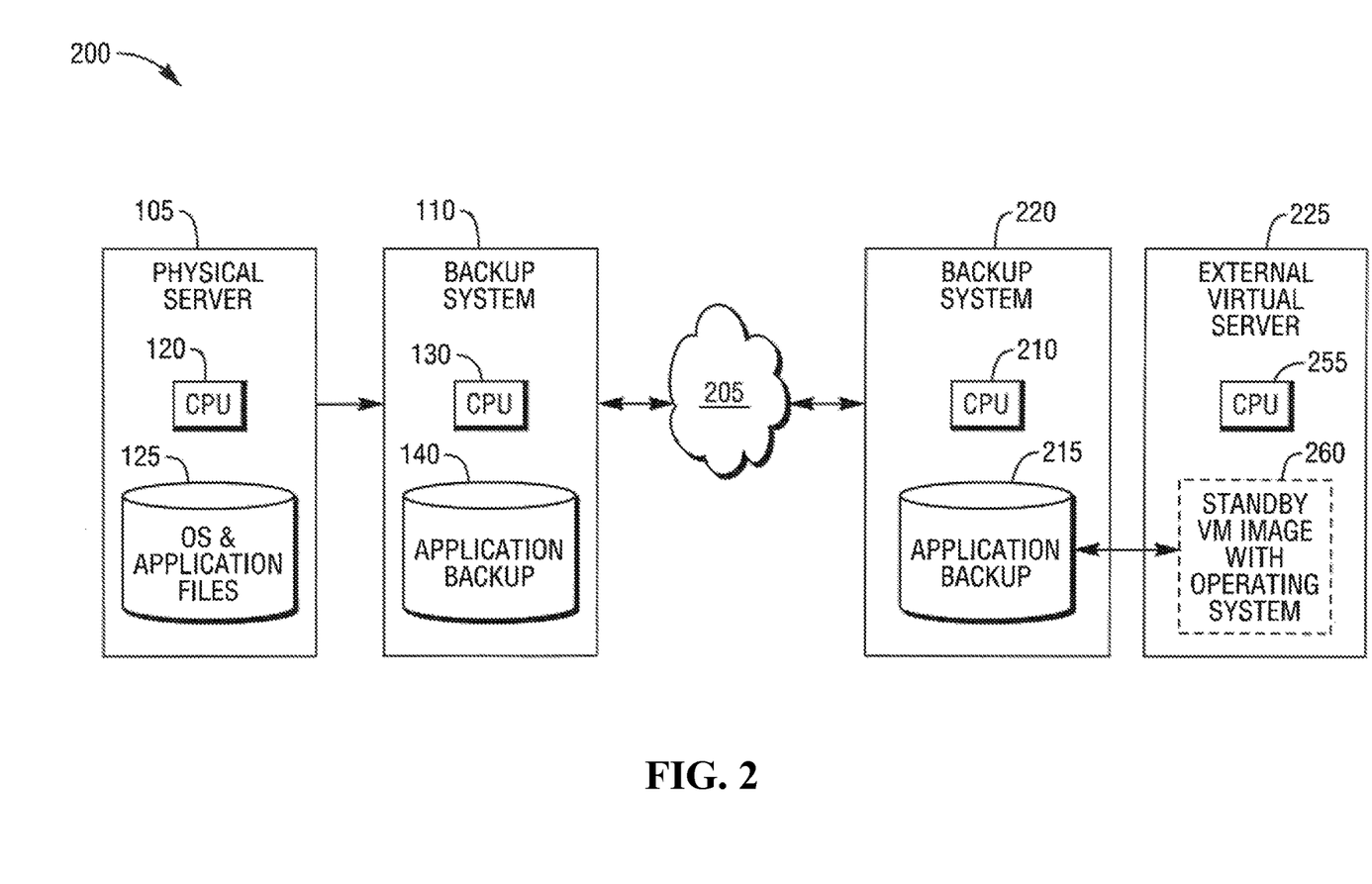
FIG. 2 is a block diagram of a remote backup system in accordance with an illustrative embodiment.

FIG. 2 is a block diagram of a remote backup system in accordance with an illustrative embodiment. In alternative embodiments, additional, fewer, and/or different elements may be used. In the embodiment illustrated in FIG. 2, application files reside and execute on the physical server 105 and are backed up to the backup system 110. The backup system 110 communicates over a network 205 to a remote backup system 220 which is in communication with an external virtual server 225. The network 205 may suitably include combinations of private and public networks where one of the public networks may include the Internet.

The embodiment illustrated in FIG. 2 provides the ability to perform an immediate recovery of the application on an external virtual server 225 remotely located from the physical server 105. In some embodiments, the immediate recovery process transfers a minimal amount of data across the network 205. To minimize the network traffic, only the backup data for the application data is transferred across the network 205 to the remote backup system 220 and stored on a storage device 215. To be able to perform an immediate recovery, the replicated backup files on the disk 215 are transferred into a standby virtual machine (VM) 260 on the external virtual server 225. The standby virtual machine 260 has a version of an operating system that is compatible with the application being restored. A CPU 255 on the external virtual server 225 executes software that creates the standby VM 260 and communicates with the remote backup system 220.

In an embodiment of the present invention, an initial bootable image is created to boot the VM 160. In some embodiments, the initial bootable image includes custom software that is not part of the software that executes or is stored on the physical server 105. The custom software is executed during the recovery process to setup and initialize a file system and to restore the backed up files to the file system. When a recovery of the physical server 105 is required, the VM 160 is placed in "restore mode." In the "restore mode," the VM 160 boots the initial bootable image and executes the custom software from the image. The custom software creates a partition on the boot drive of the VM 160 and initializes it. In an illustrative embodiment, the boot drive for the internal virtual server is the second storage device 145. The custom software requests the backed-up files for the physical server 105 and places the backed-up files in the created partition. The backed-up files may suitably include application files and, in some embodiments, operating system files. The VM 160 is switched to the "live mode." In some embodiments, the VM 160 is switched to the "live mode" after the backed-up files are stored in the partition. In the "live mode," the VM 160 reboots off of the created partition executing (at least some of) the backed up files. Executing (at least some of) the backed up files causes the VM 160 to perform the operations that were executing on the physical server 105.

In some embodiments, an audit of the backup files is performed to validate the backup files. A snapshot is taken of the created partition on the second storage device 145. In some embodiments, the snapshot is taken when an audit is being performed (e.g., upon initialization of the audit). The VM 160 switches from the "restore mode" to the "audit mode." In some embodiments, the VM 160 switches to the "audit mode" after the snapshot has been taken. In the "audit mode," the VM 160 reboots using files from the snapshot of the created partition, but halts operation after the application has been successfully started. Recovery times are determined and the snapshot and the data stored on VM 160 are deleted.

In an illustrative embodiment, the recovery method described above (or a portion thereof) can be performed by the internal virtual server 150 and/or the external virtual server 115. The virtual server 115 and/or the virtual server 150 can perform the recovery directly or by using the VM 160 and/or the VM 175 of each virtual server 115 and virtual server 150. In embodiments in which the external virtual server 115 is used to perform the recovery of the physical server 105, the partition can either be created on a storage device local to the external virtual server 115 or on the second storage device 145. In alternative embodiments, any suitable configuration may be used.

Figure 3:
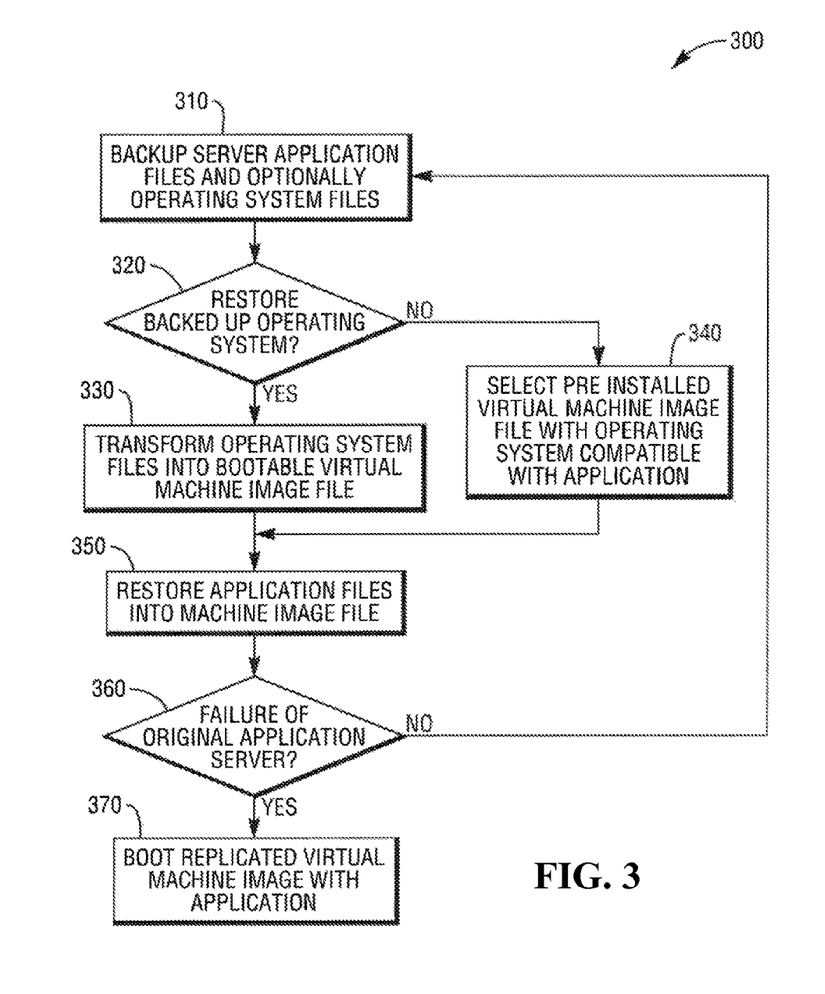
FIG. 3 is a flow chart of a method of backing up an application in accordance with an illustrative embodiment.

FIG. 3 is a flow chart of a method of backing up an application in accordance with an illustrative embodiment. In alternative embodiments, additional, fewer, and/or different elements may be used. Also, the use of a flow diagram and/or arrows is not meant to be limiting with respect to the order or flow of operations. The method performs an immediate recovery of the application files on the physical server 105 by executing backup application files on the virtual machine 160 or the virtual machine 175. The method accesses the application VM image from the second storage device 145 on the backup system 110 and transfers the data to either the virtual machine 160 of the internal virtual server 150 or to the virtual machine 175 of the external virtual server 115 for execution.

Any suitable method can be used for converting a physical server into a virtual server, which can be referred to as physical to virtual (P2V). One such method is where a bootable disk image for the virtual server is used as a starting point, and the files from the backup or application are then transferred into that bootable partition or image file. This or a similar technique can be used to transform the application backup files stored on the first storage device 140 into a bootable virtual machine image stored on the second storage device 145.

In some embodiments, the goal of various embodiments is to present a recovered running application as quickly as possible. Depending upon the goals defined for the system, it may be desired to have the recovered application running on the identical operating system configuration as the source machine, or to have the application running on a compatible version of the operating system.

At step 310, the backup system 110 receives application files and, optionally, operating system files from the physical server 105. To prepare a virtual machine image for recovery, a determination is made in step 320 whether to restore the original operating system (or use a compatible operating system). If the result of step 320 is yes, then, in step 330, the operating system files are transformed into a bootable virtual machine image. If the result of step 320 is no, then, in step 340, a pre-existing bootable virtual machine image is chosen which includes a compatible operating system that supports execution of the application. In step 350, the application files are restored to a VM image stored on the second storage device 145. In some embodiments, the VM image is ready to boot for immediate recovery after step 350.

In step 360, a check is made to determine if the physical server 105 has failed, is not available for normal use, and/or is to otherwise be recovered. If the result of step 360 is yes, control passes to step 370 for immediate recovery. In step 360, the VM image is transferred into the VM 160 and the VM image is executed. In some embodiments, the VM image is transferred to the VM 175 of the external virtual server 115 or the VM 260 of the remote external virtual server 225. If the result of operation 360 is no, control passes back to step 310 and the backup system 110 continues to receive updates to the application files.

Figure 4:
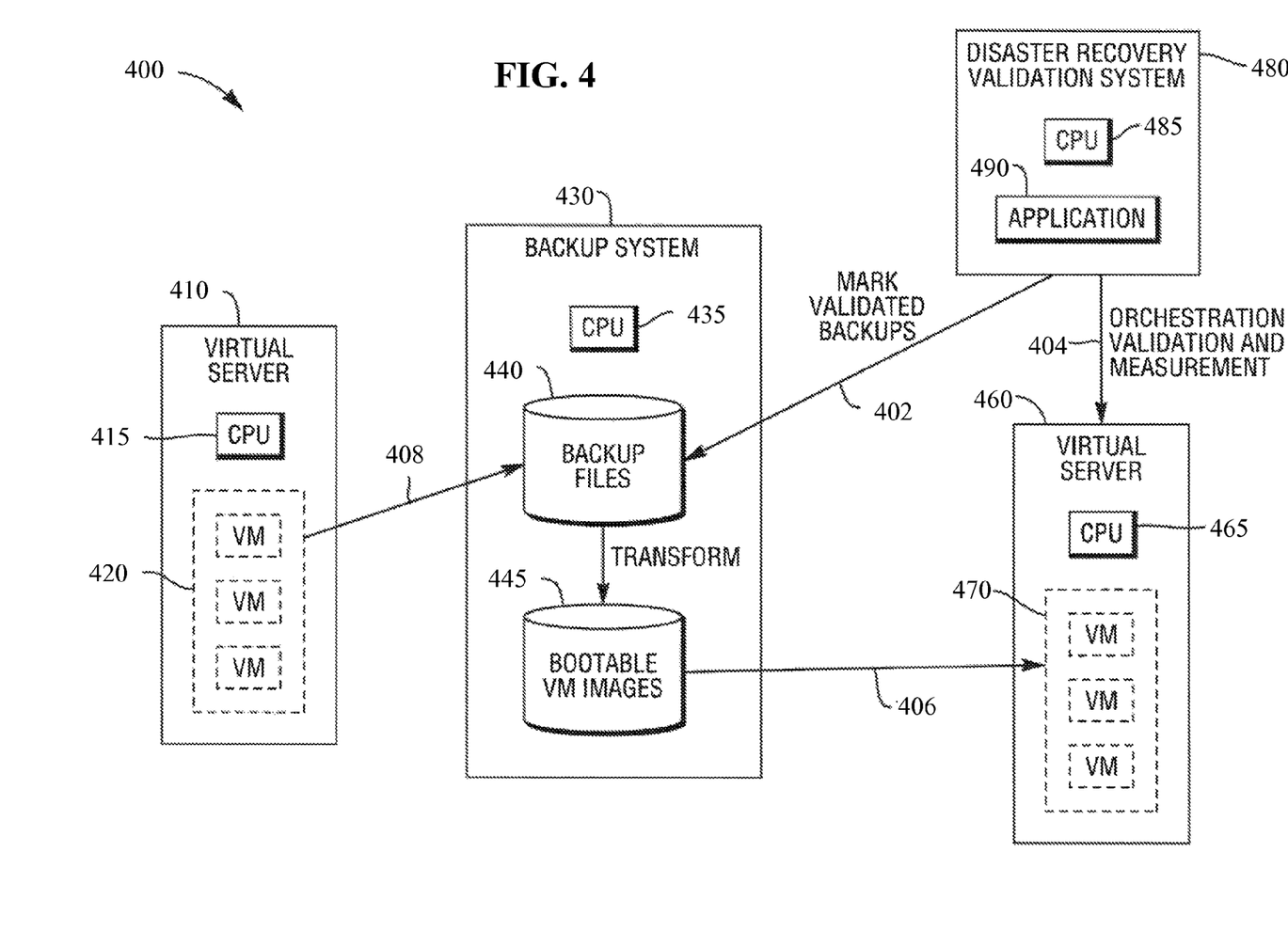
FIG. 4 is a block diagram of a backup verification system in accordance with an illustrative embodiment.

FIG. 4 is a block diagram of a backup verification system in accordance with an illustrative embodiment. In alternative embodiments, additional, fewer, and/or different elements may be used. A system 400 includes a first virtual server 410, a second virtual server 460, a backup system 430, and a disaster recovery validation system 480. The first virtual server 410 and the second virtual server 460 are physical computer systems that implement one or more virtual machines 420 and virtual machines 470, respectively. Each virtual machine can load and execute an operating system and applications.

The backup system 430, also known as a backup appliance, is used to backup the virtual machines 420 of the first virtual server 410. To backup each of the virtual machines, a backup is created for each virtual machine. A backup, sometimes referred to as a digital backup, includes information for restoring the operations of a virtual machine on another virtual machine. In some embodiments, the backup can include information for restoring operations of a physical computer on a virtual machine. In some embodiments, the backup can include information for restoring the operations of the virtual machine on another virtual machine. In an illustrative embodiment, the backup system 430 receives copies of file data over a first communication path 408 from the first virtual server 410 for each virtual machine 420 and stores the file data in a local storage 440. The backup system 430 transforms the file data and stores it in a bootable VM image 445 associated with one of the virtual machines 420. In an illustrative embodiment, the backup system 430 is one or more of the backup systems described in provisional U.S. Patent Application Ser. No. 61/968,137, filed on Mar. 20, 2014, which has the same assignee as the present application and is incorporated herein by reference in its entirety.

In some embodiments, the backup system 430 creates backups for virtual or physical machines and restores the backups as standby virtual or physical machines. In an illustrative embodiment, the restoring function is performed when an operating virtual or physical machine fails or is performed as a test to confirm that a backup can actually restore the operations of a virtual or physical machine. In some embodiments, testing a backup includes measuring restoration metrics to determine if the backup meets predetermined restoration values. The predetermined values can include, for example, maximum time to restore the backup. The backup system 430 starts a computer restore process after receiving a restore command that specifies which backup to use and a virtual or physical machine where the backup is to be restored. In some embodiments, the restore command may further include a script that is to be executed after the restore is complete. The script may be used to test the operation of the restored backup to confirm it is operating properly.

The second virtual server 460 includes a number of virtual machines (VM) 470, and at least one of the VMs 470 is used to test the restoration of a bootable VM image backup 445 and, in some embodiments, make measurements during the test. The second virtual server 460 communicates with the backup system 430 over a second communications path 406. Tests performed on the second virtual server 460 are controlled by an application 490 executing on the disaster recovery validation system 480. The application 490 is stored in a local storage that is part of the disaster recovery validation system 480. The local storage is also used to store data and information generated or used by the application 490. The disaster recovery validation system 480 uses a third communications path 404 to communicate with the second virtual server 460. The disaster recovery validation system 480 uses a fourth communications path 402 to communicate with the backup system 430.

The disaster recovery validation system 480 includes a computer with a CPU 485 that executes the application 490, which controls the features and functions of the disaster recovery validation system 480. In some embodiments, the CPU 485 can be the same CPU as the CPU 435. In some embodiments, the disaster recovery validation system 480 is implemented as part of the backup system 430. The application 490 can test one or more (e.g., all) of the bootable VM images 445. Testing of the VM images 445 can be performed in any suitable manner. For example, the testing of the VM images 445 can be scheduled (e.g., periodic). In another example, testing of the VM images 445 can be in response to a certain number of VM images 445 being stored, an amount of VM images 445 stored (e.g., size of the stored VM images 445), etc.

Testing of the bootable VM images 445 can include measuring a number of disaster recovery metrics associated with each of the bootable VM images 445. For example, for each of the bootable VM images 445, there is a set of predetermined metric values that are compared against measured values to determine if a bootable VM image 445 meets requirements for a disaster recovery plan. The disaster recovery metrics can include the recovery time objective (RTO) and the recovery point objective (RPO). An RTO can include, for example, the amount of time it takes to restore a computing device after it is determined that the computing device is to be recovered. In one example, an RTO is 30 minutes. Thus, after a computing device fails, it should take 30 minutes or less to recover the computing device. Put another way, the computing device (or its equivalent) should be available for use in no more than 30 minutes after the computing device fails. In alternative embodiments, any suitable RTO may be used. An RPO can be, for example, the amount of time (or data) lost when a computing device is recovered. For example, the RPO can be the maximum amount of time since the most recent backup. In an illustrative example, an RPO can be 8 hours. Thus, when a computing device fails, the backup of the computing device should replicate the state of the computing device from no greater than 8 hours before the computing device failed. In alternative embodiments, any suitable RPO can be used.

In some embodiments, the results of the testing are sent to the backup system 430 to be stored as attributes of the associated bootable VM image 445. The backup system 430 may suitably send notifications when a bootable VM image 445 fails to meet the requirements of a disaster recovery plan.

Figure 5:
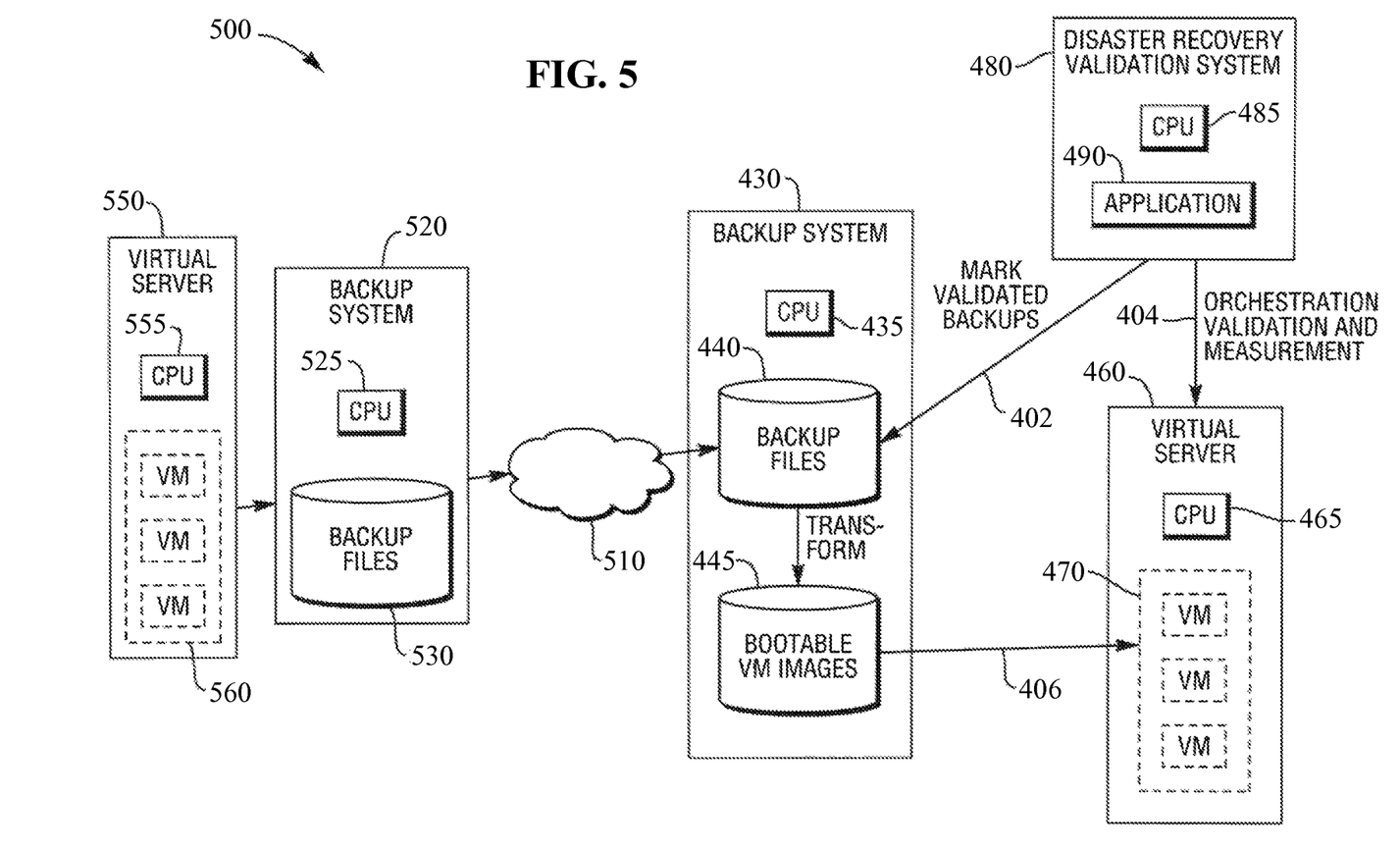
FIG. 5 is a block diagram of a remote backup verification system in accordance with an illustrative embodiment.

FIG. 5 is a block diagram of a remote backup verification system in accordance with an illustrative embodiment. In alternative embodiments, additional, fewer, and/or different elements may be used. A wide area network 510 is used to communicate with one or more remote backup systems that are located away from the main backup system 430. The wide area network 510 may suitably include a private network, a leased line network, the Internet, etc., or any combination thereof.

In an illustrative embodiment, the remote backup system 520 includes a computer with a CPU 525 and local data storage to store backup files 530. The remote backup system 520 includes an operating system and application software that controls the features and functions of the remote backup system 520. The remote backup system 520 communicates with a virtual server 550. The virtual server 550 includes a computer that supports multiple virtual machines 560 which are backed up by the remote backup system 520. The remote backup system 520 sends files over the wide area network 510 to the main backup system 430 where the bootable VM images 445 are maintained. The VM images 445 can be used to recover one or more virtual machines 560 on a virtual machine 470 of the virtual server 460.

FIGS. 4 and 5 illustrate the disaster recovery validation system 480 running on its own CPU 485 as its own software. In alternative embodiments, any suitable arrangement can be used. For example, the disaster recovery validation system 480 can be integrated into the backup system 430. In another example, the CPU 485 can be a virtual machine running on the backup system 430 or any suitable computing device. Although the backup system 430, the disaster recovery validation system 480, and the virtual server 460 are illustrated as separate devices, any combination of the components can be implemented in a separate physical system, a separate virtual machine, or can be running alongside one another.

Figure 6:
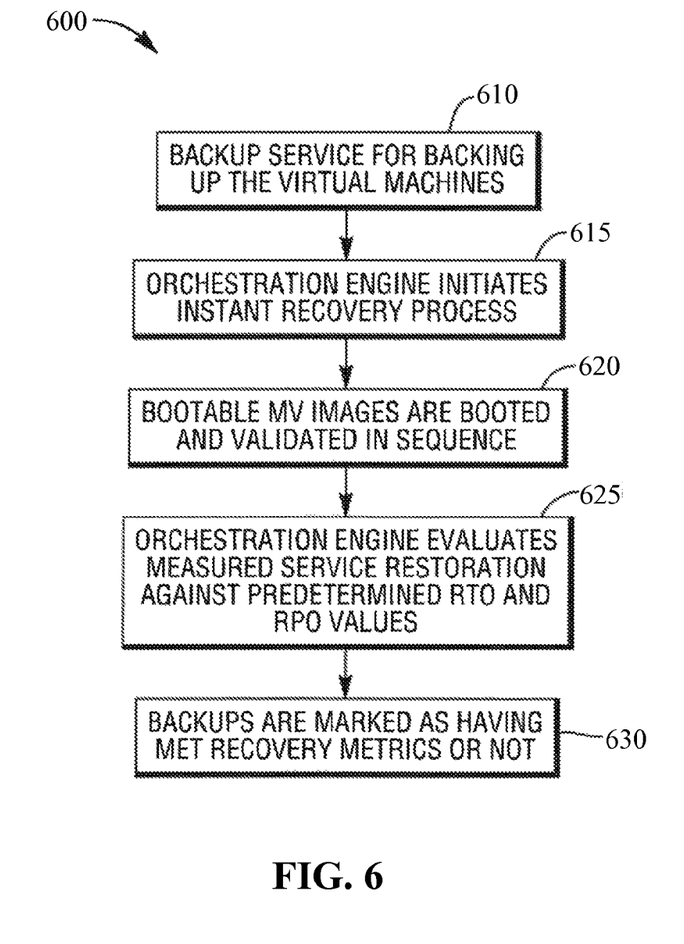
FIG. 6 is a flow chart of a method of verifying backups in accordance with an illustrative embodiment.

FIG. 6 is a flow chart of a method of verifying backups in accordance with an illustrative embodiment. In alternative embodiments, additional, fewer, and/or different elements may be used. Also, the use of a flow diagram and/or arrows is not meant to be limiting with respect to the order or flow of operations. In some embodiments, at step 610, a backup service continuously backs up the virtual machine 420 and/or the virtual machine 560. In alternative embodiments, the backup service periodically backs up the virtual machine 420 and/or the virtual machine 560. In other embodiments, any suitable method or frequency may be used to backup virtual machines. The virtual machines may be local, remote, or a combination thereof. In some embodiments, the backup service creates a bootable VM image 445 for each virtual machine that is backed up.

At step 615, the application 490 initiates the instant recovery process to test the bootable VM images 445. In some embodiments, the application 490 controls the disaster recovery validation system 480. Periodically, the application 490 will test each bootable VM image 445 to determine if the VM image 445 meets the requirements of a disaster recovery plan, which may include predetermined metric values.

At step 620, during the periodic testing of each bootable VM image 445, the application 490 starts one or more timers to measure the time for certain events associated with the instant recovery process to occur. In alternative embodiments, any suitable method for determining whether an RTO and/or an RPO are met. For example, the application 490 measures the time it takes to load and bring up a bootable VM image 445. In some embodiments, as part of the testing, each bootable VM image 445 is loaded into a virtual machine 470, the virtual machine 470 is configured to execute the bootable VM image 445, and the bootable VM image 445 is executed. Program execution continues until the data and services provided by the bootable VM image 445 are restored and available for use.

As described in step 625, execution of the virtual machine 470 is halted, final system measurements are recorded, the virtual machine 470 is deleted, and test results are produced. The recorded measurements can be compared with predetermined values that are part of a disaster recovery plan to determine if each bootable VM image 445 meets plan requirements. In an illustrative embodiment, the disaster recovery plan includes the RTO and RPO metrics. The application 490 determines the actual values for the metrics for each bootable VM image 445 and compares the actual values to the predetermined metric values stored in the plan. The comparison determines if the bootable VM images 445 have met the requirements in the disaster recovery plan.

In step 630, the results of the test are transmitted to the backup system 430 and stored as an attribute of the bootable VM image 445. The bootable VM image 445 is marked as having met or not met the requirements of the disaster recovery plan. Each of the bootable VM images 445 can be tested to determine if the respective VM image 445 meet the requirements of the disaster recovery plan.

Figure 7:
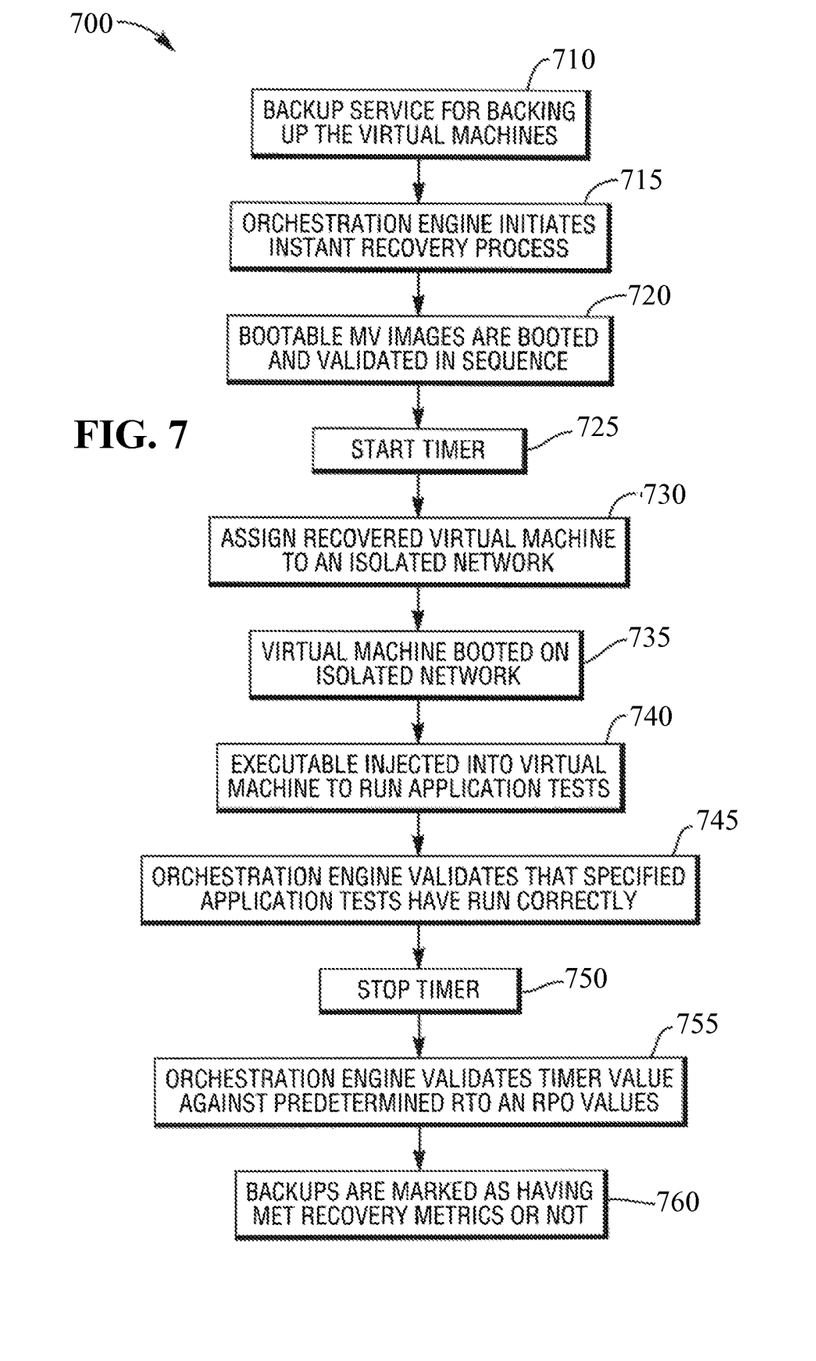
FIG. 7 is a flow chart of a method of verifying backups in accordance with an illustrative embodiment.

FIG. 7 is a flow chart of a method of verifying backups in accordance with an illustrative embodiment. In alternative embodiments, additional, fewer, and/or different elements may be used. Also, the use of a flow diagram and/or arrows is not meant to be limiting with respect to the order or flow of operations. In some embodiments, one or more of the virtual machines 470 that are used to test the bootable VM images 445 can be dynamically assigned to use an isolated network so that information generated by applications executing on the virtual machines 470 during the test cannot escape onto a production network and cause problems. In some embodiments, an isolated network is a network in which Internet traffic cannot escape on to a production or public network. Computers on an isolated network can use IP addresses that are used by computers on a production or public network without creating a conflict or other network issue. If a recovery in accordance with an alternative embodiment is made, the virtual machines 470 can be assigned to use a production network so that the applications can access whatever network resources are required (or useful) or provide whatever resources are needed (or useful).

At step 710, a backup service backs up the virtual machine 420 and/or the virtual machine 560. In some embodiments, at step 410, a backup service continuously backs up the virtual machine 420 and/or the virtual machine 560. In alternative embodiments, the backup service periodically backs up the virtual machine 420 and/or the virtual machine 560. In other embodiments, any suitable method or frequency may be used to backup virtual machines. The virtual machines may be local or remote or a combination thereof. In an illustrative embodiment, the backup service creates a bootable VM image 445 for each virtual machine that is backed up. In alternative embodiments, the backup service creates a bootable VM image 445 for any suitable number of the backed-up virtual machines.

At step 715, the application 490 initiates the instant recovery process to test the bootable VM images 445. In an illustrative embodiment, the application 490 is the application that controls the disaster recovery validation system 480. The application 490 tests each bootable VM image 445 to determine if it meets the requirements of a disaster recovery plan, which can include predefined metric values. The bootable VM images 445 can be tested at any suitable frequency or for any suitable reason.

At step 720, the application 490 starts one or more timers to measure the time it takes for certain events associated with the instant recovery process to occur. The one or more timers can be started during the testing of each bootable VM image 445. In alternative embodiments, any suitable method can be used for determining whether the VM images 445 are suitable to meet the requirements of the disaster recovery plan. For example, the application 490 can measure the time to load and bring up a bootable VM image 445. In some embodiments, as part of the testing, each bootable VM image 445 is loaded into a virtual machine 470, the virtual machine 470 is configured to execute the bootable VM image 445, and the bootable VM image 445 is executed. Program execution can continue until the data and services provided by the bootable VM image 445 are restored, available for use, and/or tested to assure that the data and services (and/or the VM image 445) are operating properly.

In step 725, a timer is started. In some embodiments, step 425 includes resetting (e.g., reinitializing) the application 490. The timer can be used to measure and determine the recovery time for the recovered virtual machines. In some embodiments, multiple timers are used to measure different aspects of the recovery process. In step 730, the recovered virtual machine is assigned to an isolated network. In some embodiments, using an isolated network allows the recovered virtual machine to use the same IP addresses as the production virtual machines without causing problems.

In step 735, the application 490 issues a command to the virtual server 460 to boot one of the virtual machines 470. In step 740, the application 490 injects an executable script into the booted virtual machine 470. In some embodiments, the script runs one or more tests specific to an application to determine if a feature or service is available for use. For example, the script may cause a database query to execute and then determine if the results are correct. In another example, the script may test a service such as an email server to determine if the service is available for use.

In step 745, the application 490 validates that the outputs of the tests are correct to determine if the applications are functioning properly. In step 750, the application 490 stops the timer and uses a value read from the timer to determine the recovery time for the bootable VM image 445.

In step 755, the application 490 halts execution of the virtual machines 470, records final system measurements, deletes the virtual machines 470, and produces test results. The recorded measurements can be compared with predetermined values that are part of a disaster recovery plan to determine if each bootable VM image 445 meets plan requirements. In an illustrative embodiment, the disaster recovery plan includes RTO and RPO metrics. The application 490 determines the actual values for these metrics for each bootable VM image 445 and compares the actual values to the predetermined metric values stored in the plan. The comparison determines if a bootable VM image 445 has met the requirements in the disaster recovery plan.

In step 760, the results of the test are transmitted to the backup system 430 and stored as an attribute of the bootable VM image 445. In some embodiments, the bootable VM image 445 is marked as having met or not met the requirements of the disaster recovery plan. Each of the bootable VM images 445 are tested to determine if they meet the requirements of the disaster recovery plan.

As discussed above with reference to FIGS. 4-7, VMs 420 of a first virtual server 410 (or VMs 560 of a second virtual server 550) can be backed up. The backups of the VMs 420 can be booted up and tested using another virtual server, such as VMs 470. In some embodiments, the VMs 470 can be tested to verify that the backup of the VMs 420 is operational. For example, within the operating environment of the VMs 470, applications can be opened and commands can be executed. In an example, an email application can be started and one or more emails can be opened within the email application. Having the emails open properly is one indication that the backup of the VMs 420 (that is running on the VMs 470) is operating properly and can be relied upon as a functional backup if the VMs 420 is to be recovered. In some embodiments, verifying functioning of a virtual machine can include step 740, discussed above.

In some embodiments, software tools running on the VMs 470 can allow another application, such as application 490, to operate within the operating system of the VMs 470. Using the example above, the application 490 can cause the email program to be started and can cause emails to be opened. The application 490 can also check for proper operation of the VMs 470 (e.g., by checking the emails that are opened, by ensuring that the VMs 470 has not crashed or slowed to unacceptable levels, etc.).

In some embodiments, without the proper software tools, the application 490 cannot access the operating system environment of the VMs 470. In most instances, preventing access to the operating system environment by another software application (e.g., application 490) is a security function. For example, by disallowing access by another software application and by only allowing access to the VMs 470 via a user input (e.g., a keyboard, a mouse, etc.), unauthorized access to the VMs 470 from a remote user or program (e.g., a hacker) is prevented. In some instances, the prevention of access of the VMs 470 by the application 490 is a default security feature of the operating system. In most instances, using a different operating system (e.g., one that allows access of the VMs 470 via the application 490) is not a practical solution. That is, in many cases, the operating system is chosen for other reasons. Thus, by installing the proper software tools to the VMs 470, the application 490 is able to more fully test the operation of the VMs 470.

In the embodiments discussed above with regard to FIGS. 4-7, the proper software tools can be installed on the first VMs 420. Thus, when the VMs 420 are backed up and the backups are booted as VMs 470, the VMs 470 already have the proper software tools installed that allow access by the application 490. The first virtual server 410, the VMs 420, the second virtual server 460, and the VMs 465 can use any suitable protocols. For example, VMWare, Inc. provides software and architecture to run virtual machines. VMWare virtual machines can run software tools such as VMWare Tools that allow access to a VMWare virtual machine by a software application outside of the virtual machine (e.g., application 490).

Many such software tools (e.g., VMWare Tools) cannot be installed on an operating system that is running on a physical device (e.g., not a virtual machine). Preventing installation of the software tools is primarily a security feature. For example, prevention of installation of software tools that allow remote access prohibits unauthorized users (e.g., software applications) from controlling a computer (and, for example, spreading the unauthorized control, such as via a virus).

Accordingly, if a backup of a physical device (which cannot have the software tools installed for security reasons) is booted up as a virtual machine (e.g., as one of VMs 470), the application 490 will not have access to the virtual machine to perform its tests, without installing the software tools on the virtual machine. Further, as discussed above, without the tools installed, remote access by a software application (e.g., application 490) is prohibited for security reasons. Thus, a software application cannot be automatically run to install the software tools on the virtual machine that would allow access by the software application.

In some embodiments, a user can access the virtual machine via user input (e.g., a keyboard, a mouse, etc.) and install the tools, thereby giving the application 490 access to the virtual machine. However, in most instances, it is cumbersome, time consuming, and expensive for a user to install the tools in the virtual machine each time a backup of a physical computer is to be tested.

Figure 8:
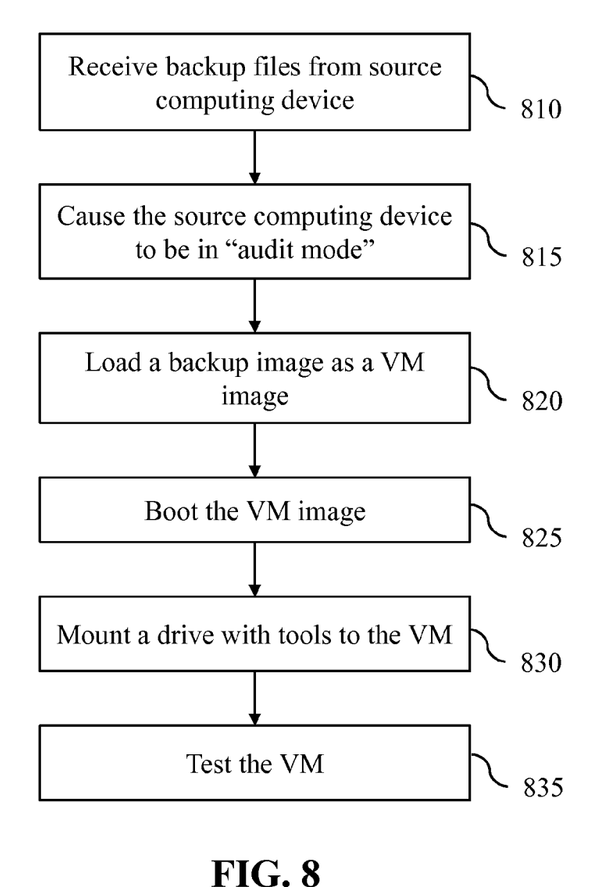
FIG. 8 is a flow diagram of a method to test a backup of a physical device as a virtual machine in accordance with an illustrative embodiment.

FIG. 8 is a flow diagram of a method to test a backup of a physical device as a virtual machine in accordance with an illustrative embodiment. In alternative embodiments, additional, fewer, and/or different elements may be used. Also, the use of a flow diagram and/or arrows is not meant to be limiting with respect to the order or flow of operations.

In step 810, backup files are received from the source computing device. In an illustrative embodiment, the source computing device is a physical computing device. In some embodiments, the backup files can be received by a backup system such as backup system 430. As discussed above with reference to FIGS. 1-3, in some embodiments, the backup files are incremental backup files. The incremental backup files can indicate what data from the source computing device has changed since the last backup file was receive. In some embodiments, the backup file can be indicative of one or more hard drives of the source computing device. In alternative embodiments, the backup files can be indicative of all files of the physical computing device.

In an illustrative embodiment, the source computing device has installed on it a backup agent. In some embodiments, the backup agent is a software application (or script) that monitors the source computing device and transmits to the backup system the backup files. In an illustrative embodiment, the backup agent can determine what is included in the backup files. In some embodiments, the backup agent can automatically check for software tools that allow access to the operating system of a virtual machine by a remote application (e.g., application 490). For example, for every drive (e.g., storage device, flash memory device, compact disk (CD) drive, etc.) that is mounted to the computing device, the backup agent can determine if the software tools are included on the drive.

When the backup agent finds the software tools, the backup agent can cause the software tools to be installed on the operating system, if possible. For example, if a flash drive is connected to a universal serial bus (USB) connection of the source computing device, the backup agent can search the contents of the flash drive for the software tools. However, in most instances, the software tools cannot be installed on a physical computer, so if the source computing device is a physical computer (e.g., not a virtual machine), then the software tools are not installed. However, if the source computing device (or a backup of the source computing device) is run as a virtual machine, the backup agent can cause, without intervention by a user, the software tools to be installed on the source computing device (or the backup of the source computing device being run an a virtual machine).

In step 815, the source computing device is caused to enter an "audit mode." In some embodiments, when the source computing device is in the audit mode, the source computing device does not transmit backup files. For example, in some embodiments, while in the audit mode, the source computing device monitors the changes to the source computing device and, when the computing device returns to normal operation (e.g., not audit mode), the computing device can transmit a backup file that contains changes to the source computing device while the source computing device was in audit mode. In some embodiments, the step 815 is not performed. In such embodiments, the backup system can continue to maintain backup files received from the source computing device.

In step 820, a backup image of the source computing device is loaded as a virtual machine image. That is, a copy of, for example, a hard drive of the source computing device is stored as a virtual hard drive for a virtual machine. The virtual machine can be, for example, one of VMs 470. In step 825, the virtual machine image is used to boot up a virtual machine. Thus, the virtual machine is a backup of the source computer. In embodiments in which the source computer is a physical machine, the virtual machine does not have installed on it the software tools that allow remote access by a software application (e.g., application 490). But, because the source computer has installed the backup agent, the virtual machine also has installed the backup agent. Thus, once the virtual machine is booted up, the backup agent running on the virtual machine is checking (e.g., attached drives) for the software tools.

In an illustrative embodiment, the virtual machine is polled to determine when the virtual machine is booted. In step 830, a drive with the software tools is mounted to the virtual machine. The drive can be any suitable virtual drive, such as a virtual hard drive, a virtual flash drive, a virtual CD drive, etc. The backup agent, running on the virtual machine, can search the drive for the software tools. When the backup agent finds the software tools on the drive, the backup agent can automatically install the software tools on the virtual machine. In some embodiments, the software tools are installed on the virtual machine without user intervention. Once the software tools are installed on the virtual machine, a software application (e.g., application 490 running on the backup system) can access the operating system of the virtual machine.

In step 835, the virtual machine is tested. The virtual machine can be tested, for example, by application 490 to verify that the virtual machine is operating properly. Testing the virtual machine can use any suitable method. For example, testing the virtual machine can include operating applications within the operating system environment of the virtual machine.

Thus, the method 800 allows a backup of a physical computer to be tested using a virtual machine, even though appropriate tools for testing the virtual machine cannot be installed on the operating system when the operating system is running on the physical machine. In some embodiments, method 800 can be performed without intervention from a user. After the method 800 is performed, the source computing device can be taken out of audit mode. For example, the source computing device can be configured to continue to provide backup files to the backup system. If the backup of the source computer passed the tests (which can be based on RTOs and/or RPOs), the backup can be stored as an acceptable backup.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "Includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for validating integrity of a source server backup comprising:
    receiving, at a recovery server, data indicating a state of a data storage unit associated with a source server;
    creating a virtual hard drive image from the received data;
    storing, in memory of the recovery server, the created virtual hard drive image;
    booting a virtual machine using the stored hard drive image;
    mounting a second drive image to the virtual machine including tools facilitating access to an operating system running on the virtual machine by an application running on the recovery server, the tools prevented from being installed in an operating system running on the source server;
    automatically detecting, by a recovery application running on the virtual machine, that the second drive image includes the tools;
    automatically installing, by the recovery application and without user intervention, the tools in the operating system running on the virtual machine; and
    controlling, by the application running on the recovery server, applications running on the virtual machine.

2. The method of claim 1, further comprising determining, by the application running on the recovery server, that the virtual machine is functioning properly.

3. The method of claim 2, further comprising storing, at the recovery server, the virtual hard drive image as an acceptable backup image for the source server.

4. The method of claim 1, further comprising:
    receiving an indication that the source server failed; and
    booting the virtual hard drive image in response to receiving the indication that the source server failed.

5. The method of claim 1, further comprising determining, by the application running on the recovery server, that the virtual machine is an acceptable backup for the source server based on a recovery time objective.

6. The method of claim 1, further comprising causing the source server to cease transmission of data indicating a state of the data storage unit associated with the source server.

7. The method of claim 1, the data indicating the state of the data storage unit comprises application files.

8. The method of claim 6, the data indicating the state of the data storage unit further comprises operating system files.

9. The method of claim 6, the data indicating the state of the data storage unit does not comprise operating system files.

10. The method of claim 1, further comprising installing, on the source server, a backup agent that searches for the tools on accessible drives.

11. The method of claim 10, said automatically installing the tools is caused by the backup agent.

12. A device for validating integrity of a source server backup comprising:
    a memory device that stores data indicating a state of a data storage unit associated with a source server; and
    a processor, operatively coupled to the memory device, that:
    creates a virtual hard drive image from the received data;
    stores, in the memory device, the created virtual hard drive image;
    boots a virtual machine using the stored hard drive image;

mounts a second drive image to the virtual machine including tools facilitating access to an operating system running on the virtual machine by a device application, the tools prevented from being installed in an operating system running on the source server;

runs the device application;

automatically detects, via a recovery application running on the virtual machine, that the second drive image includes the tools;

automatically installs, via the recovery application and without user intervention, the tools in the operating system running on the virtual machine; and controls, via the device application, applications running on the virtual machine.

13. The device of claim 12, the processor further determines, by the application running on the recovery server, that the virtual machine is functioning properly.

14. The device of claim 13, the processor further stores, in the memory device, the virtual hard drive image as an acceptable backup image for the source server.

15. The device of claim 12, the processor further determines, via the device application, that the virtual machine is an acceptable backup for the source server based at least in part on a recovery time objective.

16. The device of claim 12, the data indicating the state of the data storage unit comprises application files.

17. The device of claim 16, the data indicating the state of the data storage unit further comprises operating system files.

18. The device of claim 12, the state of the data storage unit includes a backup agent that facilitates backup of the data storage unit.

19. The device of claim 18, said automatically installing the tools is caused by the backup agent.

20. A non-transitory computer-readable medium including computer-readable instructions that, upon execution by a processor, cause a device to:

receive data indicating a state of a data storage unit associated with a source server;

create a virtual hard drive image from the received data;

store, in memory of the device, the created virtual hard drive image;

boot a virtual machine using the stored hard drive image;

mount a second drive image to the virtual machine including tools facilitating access to an operating system running on the virtual machine by an application running on the recovery server, the tools prevented from being installed in an operating system running on the source server;

automatically detect, via a recovery application running on the virtual machine, that the second drive image includes the tools;

automatically install, via the recovery application and without user intervention, the tools in the operating system running on the virtual machine; and control, via the application running on the recovery server, applications running on the virtual machine.

* * * * *